Feb. 21, 1928. 1,659,896

W. RAYM

MILLING AND LIKE ROLL OR CYLINDER AND METHOD OF MANUFACTURING THE SAME

Filed Nov. 11, 1924   3 Sheets-Sheet 1

Inventor
Willibald Raym,
By _____ atty.

Feb. 21, 1928.

W. RAYM 1,659,896

MILLING AND LIKE ROLL OR CYLINDER AND METHOD OF MANUFACTURING THE SAME

Filed Nov. 11, 1924   3 Sheets-Sheet 3

Inventor
Willibald Raym
by Henry Orth Jr.
atty.

Patented Feb. 21, 1928.

1,659,896

UNITED STATES PATENT OFFICE.

WILLIBALD RAYM, OF DEUZ, GERMANY.

MILLING AND LIKE ROLL OR CYLINDER AND METHOD OF MANUFACTURING THE SAME.

Application filed November 11, 1924, Serial No. 749,224, and in Germany December 17, 1923.

The object of the present invention is a milling or like roll or cylinder and the method of manufacturing the same, which has, in comparison with known methods, substantial advantages. Firstly, casting material is saved, and secondly the roll is extremely simple and may be manufactured cheaply. For this purpose a core or body of less costly material than that from which the roll itself is to be made is employed. This core is directly secured to the shaft, which latter is to have the roll cast about it, whereupon a centrifugal casting is made, the shaft, the core and the surrounding mould being quickly rotated. The core may be formed as a hollow body, for example, of sheet metal or the like, but it may also be made as a solid body, and in such case may be of cement, wood or other suitable substance. If the diameter of the core be then sufficiently large a considerable saving in casting material will be effected since the space taken up by the core within the mould need not be filled with metal.

In the case the core being made of sheet metal, it can be provided with two naves or sleeves surrounding the shaft at the place where the latter is to be connected by casting to the roll to be produced.

This has the advantage that at said place the cast metal does not become welded to the shaft, and consequently the shaft may be removed without being damaged when the roll itself is worn. These naves or sleeves of sheet metal, or other suitable material, may also be used as insulating material between the cast metal and the shaft if the core is made of other material than sheet metal.

The method can also be carried into effect by providing the shaft with one or more spoked discs or spiders before inserting into the mould. The cylinder or roll is then produced by centrifugal casting whereby the discs become welded or secured to the roll. In this way a hollow roll is produced, which is very light, and whereby considerable saving on material is effected.

In a modified arrangement the cylindrical roll may be separately made from the part or parts which are to connect it to the shaft, two bent end discs, which may advantageously be made of sheet metal being provided and secured to the shaft, and are so shaped that each of the discs is provided with a nave or central sleeve and an outer surface inclined in an inward or outward direction, and engaging against corresponding bevelled or inclined surfaces at the ends of the cylindrical roll, whereby the manufacture of the rolls is considerably simplified. The end discs are securely connected to the shaft by rings shrunk on hot, or by screw nuts, keys or the like.

Several forms of construction according to the invention are illustrated, by way of example, in the accompanying drawings, in which:—

Figure 1:
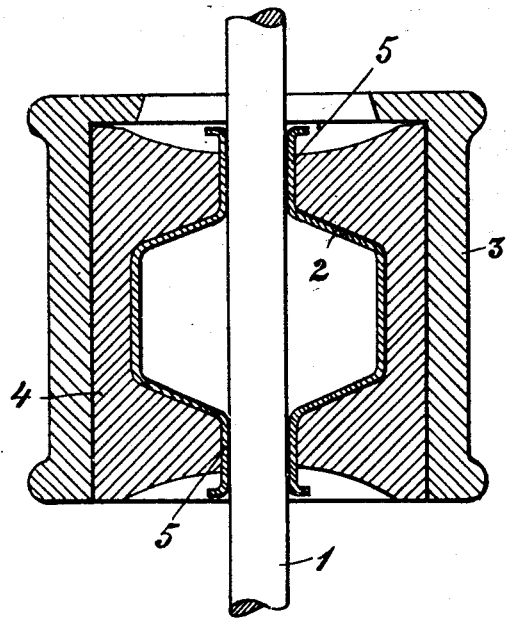
Fig. 1 shows one constructional form of a roll, formed by the centrifugal casting method, in longitudinal section.

In the form of construction according to Fig. 1 the shaft, to be connected by casting to the roll, is designated by 1 and is provided with a core formed as a hollow body 2 of sheet metal, either drawn in one piece or composed of two pieces which are joined together at or about their middle. The mould proper is designated by 3 and the roll to be cast by 4. The hollow body 2 is provided with two naves 5 which surround those portions of the shaft 1, with which the cast metal would otherwise come in contact.

By this arrangement a welding together of the metal with the shaft is prevented, so that the shaft may be removed from the roll, should the rolling surface become worn.

The casting is effected by the mould 3 together with the shaft 1 and its core 2 being subjected to quick rotation while, simultaneously, the metal is poured into the mould, the bottom of the mould being suitably closed during the operation. In this manner, since a large hollow space is formed within the roll, a great saving of material is effected.

If desired the casting may also be effected with the shaft 1 horizontally arranged.

Figure 2:
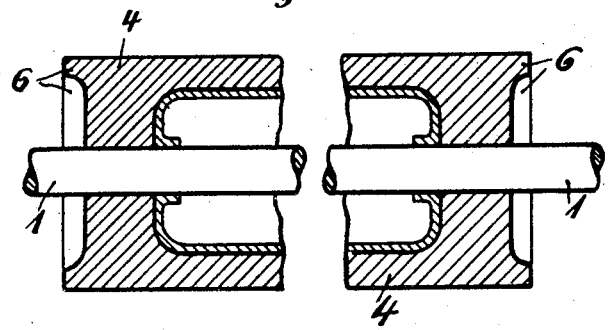
Figs. 2 and 3 show in longitudinal section, two other constructional forms of rolls with recessed ends, facilitating the machining thereof.

In the form of construction according to Fig. 2 the roll 4 is cast in a similar manner, but the end rims 6 of the roll project peripherally beyond the inner end surfaces, so that only these end rims 6 need to be machined, thus reducing the machining of the end surfaces very considerably.

Figure 3:
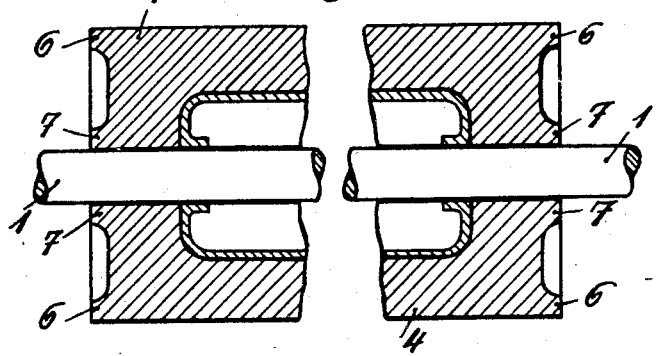

In the form of construction according to Fig. 3, in addition to the projecting rim portion 6 the projecting portions 7 are provided in the centre where the shaft 1 passes through the ends. The portions 7 may be machined simultaneously with the rims 6.

Figure 4:
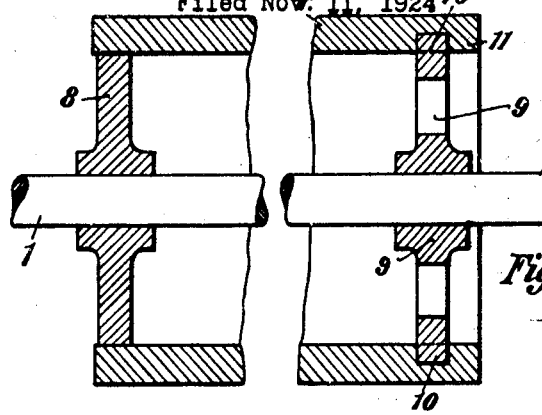
Figs. 4 and 5 show a roll in longitudinal section and end view respectively, with carrier and discs connected by casting to the cylindrical roll.
Figure 5:
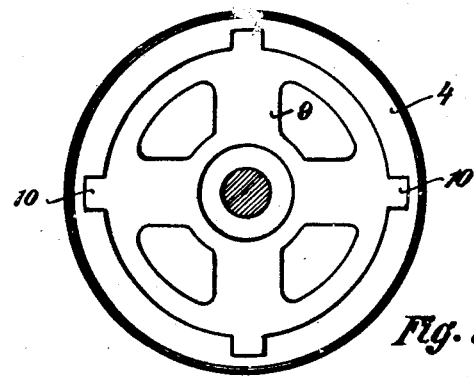

In the form of construction according to Figs. 4 and 5, two carrier end discs 8 and 9, which may be spoked, are secured to the shaft 1 by shrinking-on, pressing, wedging, or in other suitable manner. The shaft 1 with the two discs 8 and 9 is then inserted into the mould, and the shaft together with the mould rotated quickly.

The shaft 1 may be arranged horizontally, and the liquid metal is poured in from the side employing for this purpose an appropriate pouring spout, at the same time the mould and carrier discs being rotated together with the shaft; thereby a cylinder 4 is formed which becomes welded to the carrier discs 8 and 9, and which, since the same is cast under centrifugal action, is extremely hard on its surface. The carrier discs may have lugs or projections 10, which become embedded in the cylinder 4, thus ensuring a good grip. The mould for the cylinder 4 projects at 11 beyond the disc 9 in order to enable the pouring in of metal from the side. If desired this projecting portion of the cylinder can be removed later.

Figure 6:
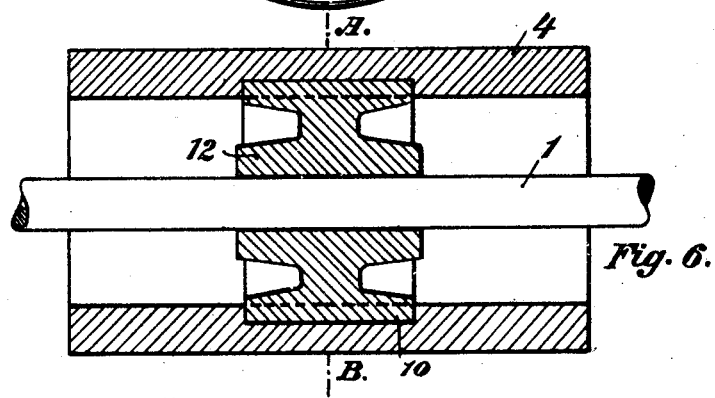
Fig. 6 is a longitudinal section of a modification showing an arrangement in which instead of two end carrier discs one central carrier is provided in the cylindrical roll.
Figure 7:
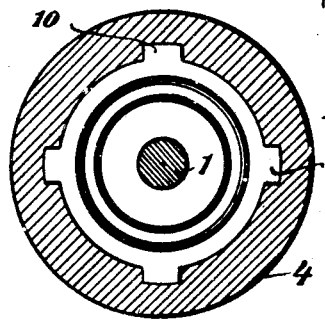
Fig. 7 is a cross section on the line A—B of Fig. 6.

In the form of construction according to Figs. 6 and 7 the process is substantially the same, but instead of two carrier discs only one 12 is here employed, being likewise suitably secured to the shaft 1. The cylinder 4 is made in the same manner by centrifugal casting, and projections 10 on the disc 12 which become embedded in the cylinder are also provided in this case.

Figure 8:
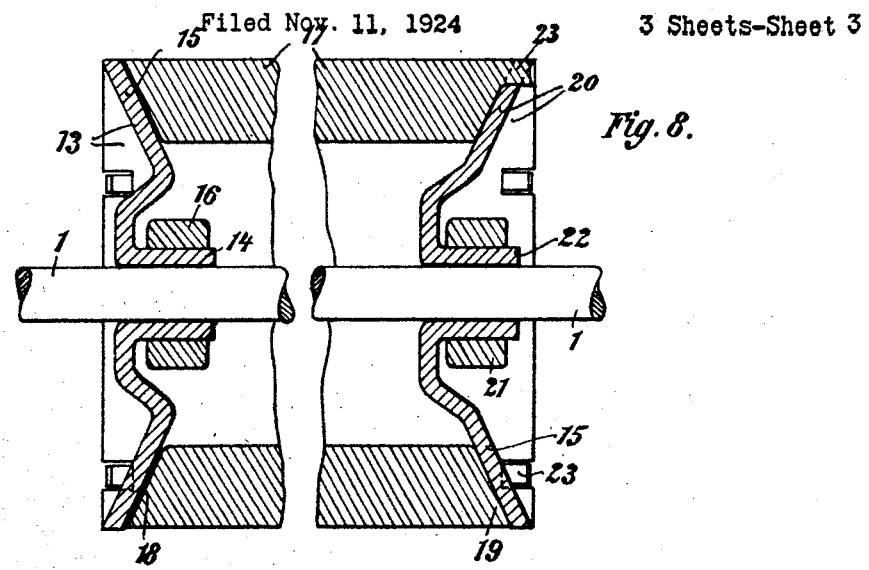
Figs. 8, 9 and 10 show various forms of construction in longitudinal section.

In the form of construction according to Fig. 8 an end disc 13 of sheet metal is first secured to the shaft 1, which disc is provided with a nave or sleeve 14 and with an inclined outer portion 15. The nave 14 is secured to the shaft 1 by means of a ring 16, which is shrunk on hot.

The cylinder 17 is cast separately and provided with bevelled end surfaces 18 and 19 corresponding to the inclination of the disc 13. The surface 18 rests against the inclined outer portion of disc 13, whereas the surface 19 rests against the similar surface of a second end disc 20, which is subsequently pushed on the shaft 1 and secured by means of a shrunk on ring 21, which is placed over the nave 22. On pressing the second disc 20 against the cylinder 17, the axis of the latter is made identical with that of the shaft 1. The cylinder 17 is securely held and engaged by friction with the two end discs, but in order to increase the secure engagement, the cylinder 17 may be provided at one or both ends with several projections 23 adapted to engage in corresponding slots in one or both of the end discs.

Figure 9:
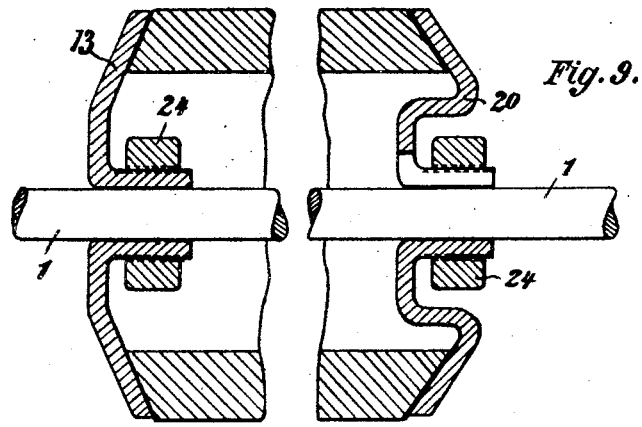

In the form of construction according to Fig. 9 the end discs and the cylinder are similarly formed, only here the bevels and inclines are arranged in reversed order, a centering of the cylinder thereby being effected. In this construction the rings 16, 21 of Fig. 8 are replaced by nuts 24, which are screwed upon the nave portions of the discs, which, for this purpose, are provided with threads and are slotted, thus ensuring a secure engagement of the discs 13, 20 on the shaft 1 and facilitating the removal or exchange of the cylinder 17.

Figure 10:
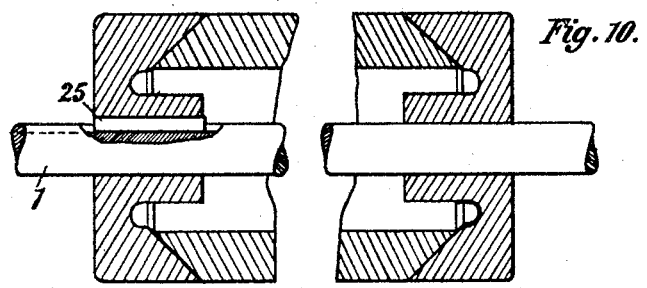

In the form of construction according to Fig. 10 the end discs are made of castings instead of sheet metal. The securing to the shaft may in this case be effected in any appropriate manner, for example by means of one or more keys engaging in key ways in the shaft 1. The centering of the cylindrical roll is here also automatically effected by the assembling of the parts.

It is obvious that the bevels instead of being diverging or converging as shown in Figs. 8, 9 and 10, may also be parallel one to another, by which also the centering of the roll is made possible.

I claim:

1. The art of making heavy metal rolls, which comprises providing a shaft with a support for the roll rim, placing it in a mold, rotating the shaft with the support and the mold and centrifugally casting the metal rim onto the support with a portion of the support surrounded by the metal of the rim.

2. The art of making heavy hollow metal rolls, which comprises providing a shaft with one or more metallic detachable roll rim supports, placing said assemblage in a mold, rotating the mold with the assemblage and centrifugally casting the metal rim.

3. The art of making hollow rolls, which comprises providing a shaft with one or more sheet metal supports, placing the assemblage in a mold, rotating the mold with the assemblage therein and centrifugally casting the metal rim and roll ends.

4. A ferrous metal roll having a shaft, a rim support thereon, and a centrifugally cast metal rim in welded connection with said support.

5. A metal roll having a shaft, one or more rim supports thereon and a centrifugally cast metal rim in welded connection with said supports, and the rim and supports being of metal of different compositions and the rim partly inclosing the supports.

6. A metal roll having a shaft, one or more sheet metal rim supports thereon, and a centrifugally cast metallic rim in welded connection with said support.

7. The art of making metal rolls, which comprises securing to a shaft a light, hollow rim support and centrifugally casting an iron rim thereon.

8. The art of making hollow metal rolls, which comprises providing a shaft with a hollow sheet metal core having closed ends and casting a metal rim centrifugally about the core and its ends and welded thereto, to form a hollow roll enclosing the core.

9. The art of making a hollow metal roll, which comprises providing a shaft with a hollow sheet metal core having naves surrounding said shaft, and casting a metal rim on said core and naves.

10. The art of making ferrous metal hollow rolls, which comprises placing on a shaft a hollow sheet metal core with closed ends extending from the shaft to the periphery of the core, placing the shaft and core in a centrifugal mold with the core surfaces spaced from the mold, and centrifugally casting the rim of the roll on to the core and over the ends thereof.

11. The art of making ferrous metal hollow rolls, which comprises placing on a shaft a hollow sheet metal core having closed ends and hubs extending outwardly along the shaft, placing the shaft and core in a centrifugal mold in spaced relation thereto and centrifugally casting ferrous metal over the core including said ends and sleeves.

In testimony that I claim the foregoing as my invention, I have signed my name.

Dip. Ing. WILLIBALD RAYM.